(12) United States Patent
Schat (10) Patent No.: US 11,518,343 B2
(45) Date of Patent: Dec. 6, 2022

(54) VEHICLE ACCESS BASED ON RF DIGESTS/BACKGROUNDS

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 386 days.

(21) Appl. No.: 16/781,560

(22) Filed: Feb. 4, 2020

(65) Prior Publication Data

US 2021/0237688 A1 Aug. 5, 2021

(51) Int. Cl.
*H04W 12/00* (2021.01)
*H04W 12/037* (2021.01)
*B60R 25/24* (2013.01)
*G01S 13/76* (2006.01)
*B60R 25/20* (2013.01)

(52) U.S. Cl.
CPC ........ *B60R 25/245* (2013.01); *B60R 25/2072* (2013.01); *G01S 13/765* (2013.01); *H04W 12/009* (2019.01); *H04W 12/037* (2021.01); *B60R 2325/108* (2013.01)

(58) Field of Classification Search
CPC .. B60R 25/245; G01S 13/765; H04W 12/009; H04W 12/0017
See application file for complete search history.

(56) References Cited

U.S. PATENT DOCUMENTS

| | | | |
|---|---|---|---|
| 5,289,497 A | 2/1994 | Jacobson et al. | |
| 9,386,415 B2 | 7/2016 | Li et al. | |
| 9,667,364 B2 | 5/2017 | Corson et al. | |
| 9,775,034 B2 | 9/2017 | Hekstra et al. | |
| 10,328,898 B2 * | 6/2019 | Golsch | G01S 5/04 |
| 10,562,495 B2 * | 2/2020 | Kristinsson | B60R 25/243 |
| 10,766,458 B2 * | 9/2020 | Casamassima | B60R 25/209 |
| 10,778,758 B2 * | 9/2020 | Chen | H04L 67/12 |
| 10,911,949 B2 * | 2/2021 | Nölscher | H04L 9/3297 |
| 11,037,387 B1 * | 6/2021 | Elangovan | G07C 9/00309 |
| 11,301,800 B1 * | 4/2022 | Bhagwat | G06Q 10/063114 |
| 2017/0359134 A1 | 12/2017 | Baier et al. | |
| 2018/0103414 A1 * | 4/2018 | Golsch | H04W 48/04 |
| 2019/0227539 A1 * | 7/2019 | Golgiri | G05D 1/0016 |

(Continued)

FOREIGN PATENT DOCUMENTS

EP 3054716 A1 8/2016

OTHER PUBLICATIONS

U.S. Appl. No. 16/237,633, filed Dec. 31, 2018, 35 pages.

(Continued)

*Primary Examiner* — Viral S Lakhia (57) ABSTRACT

According to certain examples, a circuit-based wireless communications system provides secure access to a vehicle by way of certain circuitry configure to compare a first RF background observed for a vehicle-located RF receiver that is part of a vehicle-located circuit secured to a vehicle, with a second RF background observed for a wireless-communications vehicle-access circuit that includes another RF receiver. In response, a distance metric is generated to indicate a degree of similarity between the first RF background and the second RF background, and based on whether this metric satisfies a threshold, access to the vehicle may be granted via the wireless-communications vehicle-access circuit.

20 Claims, 2 Drawing Sheets

(56) References Cited

U.S. PATENT DOCUMENTS

| | | | |
|---|---|---|---|
| 2019/0302764 A1* | 10/2019 | Smith | G05D 1/0276 |
| 2020/0122686 A1* | 4/2020 | Siswick | B60R 25/00 |
| 2020/0384951 A1* | 12/2020 | Preradovic | H04W 76/10 |
| 2021/0356279 A1* | 11/2021 | Szigeti | G01C 21/3407 |

OTHER PUBLICATIONS

Electromagnetic Field Measurement Method to Generate Radiation Map, Cesar Camilo Rodriguez, Celso Andres Forero, Homero Ortega Boada, 2012 Colombian Communications Conference, p. 1-7.

Measurements of Non-Ionizing Radiation Levels in an Urban Environment, C Pérez-Vega, J.M Zamanillo, The European Conference on Wireless Technology, 2005, p. 205-208.

On Spectrum Occupancy Measurements at 2.4 GHz ISM Band for Cognitive Radio Applications, Marco Cardenas-Juarez, Miguel A. Diaz-Ibarra, Ulises Pineda-Rico, Armando Arce and Enrique Stevens-Navarro, 2016 International Conference on Electronics, Communications and Computers, p. 25-31.

An Ultra Wideband Survey: Global Regulations and Impulse Radio Research Based on Standards, Ville Niemelä, Jussi Haapola, Matti Hamalainen, Jari linatti, IEEE Communications Surveys & Tutorials, vol. 19, No. 2, Second Quarter 2017, p. 874-890.

Comparing Historical and Current Spectrum Occupancy Measurements in the Context of Cognitive Radio, M. Mehdawi, N. Riley, M Ammar, M. Zolfaghari, 20th Telecommunications Forum 2012, p. 623-626.

GSM Downlink Spectrum Occupancy Modeling, Luis Mendes, Luis Gonyalves, Atilio Gameirot, 2011, 22nd International Symposium on Personal, Indoor and Mobile Radio Communications, p. 546-550.

Are We Really Close? Verifying Proximity in Wireless Systems, Aanjhan Ranganathan, Srdjan Capkun, IEEE Security & Privacy (vol. 15, Issue: 3, 2017), p. 52-58.

Trust Management Method of D2D Communication Based on RF Fingerprint Identification, Zhaoyue Zhang, Xinghao Guo, Yun Lin, IEEE Access, Year: 2018 vol. 6, p. 66082-66087.

RF Fingerprinting Physical Objects for Anticounterfeiting Applications, Vasileios Lakafosis, Anya Traille, Hoseon Lee, Edward Gebara, Manos M. Tentzeris, Gerald R. DeJean, Darko Kirovski, IEEE Transactions on Microwave Theory and Techniques, vol. 59, No. 2, Feb. 2011, p. 504-514.

Design of a Hybrid RF Fingerprint Extraction and Device Classification Scheme, Linning Peng, Aiqun Hu, Junqing Zhang, Yu Jiang, Jiabao Yu, Yan Yan, IEEE Internet of Things Journal, vol. 6, No. 1, Feb. 2019, p. 349-360.

RF Fingerprint Detection in a Wireless Multipath Channel, Irwin O. Kennedy, Alexandr M. Kuzminskiy, ISWCS 2010, p. 820-823.

New Efficient RF Fingerprint-Based Security Solution for Bluetooth Secure Simple Pairing, Sanna Pasanen, Keijo Haataja, Niina Paivinen, Pekka Toivanen, Proceedings of the 43rd Hawaii International Conference on System Sciences-2010, p. 1-8.

Machine Learning Approach to RF Transmitter Identification, Khalid Youssef, Louis Bouchard, Karen Haigh, Jan Silovsky, Bishal Thapa, Chris Vander Valk, IEEE Journal of Radio Frequency Identification, vol. 2, No. 4, Dec. 2018, p. 197-205.

Dentification of Cloned HF RFID Proximity Cards Based on RF Fingerprinting, Guozhu Zhang, Luning Xia, Shijie Jia, Yafei Ji, 2016 IEEE Trustcom/BigDataSE/ISPA, p. 292-300.

* cited by examiner

VEHICLE ACCESS BASED ON RF DIGESTS/BACKGROUNDS

Aspects of various embodiments are directed to systems, such as keyless entry-and-go systems, using wireless access to vehicles such as automobiles including cars and the like.

In a keyless entry-and-go system for vehicles, the authentication can be compromised by so-called relay attacks, in which a malicious attacker uses wireless-communication circuitry in an attempt to make the system believe that a legitimate owner of the key fob has the key fob nearby the vehicle; whereas in reality, the legitimate owner of the key fob is distant from the vehicle and the relay attacker sends an unauthorized communication in attempt to access the vehicle as though the attacker is the legitimate key fob owner so that the system grants access to the attacker.

One approach for a counter-measure against relay attacks is the Ultra-Wideband ("UWB") Distance Bounding. A drawback is that it requires a wideband transmitter which needs to conform to regulations with respect to the allowed bandwidth, power and repetition rate. These regulations often vary from country to country. Moreover, the transmitter needs significant chip area and battery power. Also, it has been reported that certain UWB distance bounding systems may be vulnerable to such attacks.

These and other matters have presented challenges, for a variety of applications.

SUMMARY

Various example embodiments are directed to issues such as those above and others as may become apparent from the following disclosure concerning secure wireless communications for access to a vehicle.

In certain example embodiments, aspects of the present disclosure involve an apparatus including a data-processing circuit and wireless communications circuitry. The data-processing circuit is to compare a first RF background observed by a vehicle-located RF receiver which is part of a vehicle-located circuit secured to a vehicle, with a second RF background observed for a wireless-communications vehicle-access circuit that includes another RF receiver. In response, a distance metric is generated as an indication of a degree of similarity between the first RF background and the second RF background. The wireless communications circuitry is to communicate data between the vehicle-located circuit and the wireless-communications vehicle-access circuit and grant access to the vehicle, via the wireless-communications vehicle-access circuit, in response to the metric satisfying a threshold (e.g., an upper threshold setting a maximum-difference tolerance).

In a specific example, the data-processing circuit may be communicatively integrated with the vehicle-located circuit, and the wireless-communications vehicle-access circuit is part of a key fob. Also in a more specific example, the wireless-communications vehicle-access circuit may use ultra-wideband (UWB) RF transmissions of the monitored RF background for UWB-based distance bounding, and with a distance-based RF metric being at least partly based on the UWB-based distance bounding.

In other related embodiments relating to secure wireless communications for access to a vehicle, a method includes comparing a first RF background observed for a vehicle-located RF receiver that is part of a vehicle-located circuit secured to a vehicle, with a second RF background observed for a wireless-communications vehicle-access circuit that includes another RF receiver, and in response, producing a distance metric indicative of a degree of similarity between the first RF background and the second RF background. In response to the metric satisfying a threshold and conveying data between the vehicle-located circuit and the wireless-communications vehicle-access circuit, access to the vehicle via the wireless-communications vehicle-access circuit is granted; and if the threshold is not satisfied, the request for access is refused.

Using such a method, the metric may provide a distance measurement estimating a proximity relationship between the vehicle and the wireless-communications vehicle-access circuit, with the proximity relationship corresponding to a maximum distance for a user to visualize the vehicle while securing the wireless-communications vehicle-access circuit.

In a more specific implementation, such a method may involve the wireless-communications vehicle-access circuit observing the second RF background to provide an RF digest corresponding to a set of characteristics including characteristics associated with variability of spectral power of a number of frequency bands wherein communicating data between the vehicle-located circuit and the wireless-communications vehicle-access circuit includes conveying a representation of the RF digest. Also, logic/CPU processing circuitry may be integrated and used in connection with the wireless communications circuitry for vehicle-located circuit. With such logic/CPU processing circuitry, the vehicle-located circuit may use and/or compare representations of the RF digest to generate the metric and therein assess whether the metric satisfies a threshold for granting access to the vehicle.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving wireless access to vehicles such as automobiles including cars and the like. In certain implementations, aspects of the present disclosure have been shown to be beneficial when used in the context of secure wireless access to such vehicles based on user-operated keyless entry apparatuses (e.g., systems and devices) including, for examples key fobs as used for access to vehicles. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Consistent with the present disclosure, one set of example embodiments exploit the wireless RF environment which is typical in many venues where a vehicle might be accessed via wireless communications between the vehicle and the vehicle owner. The wireless RF environment, at any point of time, may be expected to have several RF transmissions in the GHz range which are observable near both the car and the car owner. These may include, as examples, WLAN, Bluetooth, ZigBee, GSM, LTI, 5G, etc. Collectively, such RF transmissions form an RF background. The spectrum of this RF background may vary within a few milliseconds, and also may vary from one place to another, for example, places separated in distance from 20 meters to 30 meters. Power/signal-frequency characteristics such as signal strength, the frequencies of the strongest spectral components, etc. may be summarized in an RF digest (e.g., as a subset of all such RF transmissions) so as to provide a relatively constant parameter within a few meters distance of where the RF digest is created from the observed RF background. This parameter helps to indicate whether the place of the vehicle, while observing the RF background, is the same place or near the same place (e.g., a "common location" per a threshold used in comparing the two RF digests) as where key fob user/owner is while the key fob is observing the RF background.

According to one specific embodiment, such wireless RF environments are used by an example method to assess whether to grant access to a vehicle. The grant for access may be requested by a wireless-communications vehicle-access circuit (e.g., a key fob) that includes another RF receiver. In this context and according to the instant disclosure, the example method includes comparing a first RF background observed by a vehicle-located RF receiver that is part of a vehicle-located circuit secured to a vehicle, with a second RF background observed for a wireless-communications vehicle-access circuit that includes another RF receiver. In response, a distance metric is produced at or on behalf of the vehicle-located circuitry to indicate a degree of similarity between the first RF background and the second RF background. If this degree of similarity satisfies a threshold used in connection with comparison (per data communicated between the vehicle-located circuit and the wireless-communications vehicle-access circuit), access to the vehicle may be granted.

In connection with the above method and in contexts applicable to certain systems, the wireless-communications vehicle-access circuit includes or refers to a key fob associated with a wireless-communications key-entry circuit in the automobile, and each of the RF receivers (one for the key fob and another one for the vehicle) is configured to monitor a (common) range of an RF frequency spectrum that spans frequencies used by disparate RF communications systems. As such RF systems communicate disparate sets of information respective to and on behalf of the disparate RF communications systems, respective outputs of the RF receivers are used in the above-noted comparison.

In other related embodiments, each of the respective outputs may provide an RF digest corresponding to a set of characteristics including characteristics associated with variability of spectral power of a number of frequency bands. Also, data communicated between the vehicle-located circuit and the wireless-communications vehicle-access circuit may convey a representation of the RF background (or a representation of the RF digest), and in response logic/computer processing circuitry in the vehicle-located circuit may use the representations of the RF digest to generate the metric and assess whether the metric satisfies the threshold for granting access to the vehicle.

Further, the first and second RF backgrounds may be used to provide various types of assessment and/or estimation of distance measurements (upon which the metric may be based at least in part) for estimating a location-proximity relationship between the vehicle-located circuit and the wireless-communications vehicle-access circuit. In more specific embodiments, the metric provides a distance measurement estimating a proximity relationship between the vehicle and the wireless-communications vehicle-access circuit. The proximity relationship may correspond to a maximum distance for a user to visualize the vehicle while securing the wireless-communications vehicle-access circuit. In various examples, the maximum distance may be set as a fixed/default-programmed value in a range between 5 meters and 40 meters, and/or set as a user-programmable value in this or another range (typically in a range from a 2-3 meters up to 50 meters).

Another related specific example concerns an embodiment that uses the respectively-observed RF backgrounds as RF digests, for assessing whether the car and car owner are sufficiently near each other to mitigate and/or prevent a malicious attack. Each RF receiver may be configured to observe the background in an attempt to generate similar (or common) RF digests. The fob, in the hand of the car owner, may create an RF digest and send it to the car, and the car may create its own RF digest for comparing. These two RF digests should differ only slightly, provided the car and the fob are near to each other. If a relay attacker would want to compromise this system, nearly the whole spectrum of the RF background as observed by the RF receiver of the car would need to be transferred to the remote key fob, and this is not practicable given the typical limitations and/or limited bandwidth associated with such a relay attack. Moreover, the attacker would have to shield the key fob from the local RF background, to prevent the fob from creating a false RF digest or an RF digest different to the one intended by the attacker (because actually, this prevents creating a true RF digest), based on the superposition of the RF background transferred by the relay channel, based on the local RF background at the position, and based on the location of the key fob as perceived from another observation of the RF background.

In certain embodiments according to the instant disclosure, each of the generated RF digests provides radio-frequency-spectrum data which is specific to transmissions sent from one of the RF receivers to the other of the RF receivers, and in a way that would frustrate intervening relays likely used by an attacker and in a way that shows the respective locations as being a common location. In such example, the communications are considered direct and without an intervening transmission/relay system using other RF transceivers of an attacker.

Consistent with the above discussion, more detailed embodiments includes aspects or features implemented in a way to provide distance bounding which can be either used stand-alone, or used in a complementary manner with an existing UWB-based distance bounding system. Such detailed embodiments may include the following aspects and activities: the car requests from the key fob to provide an RF digest based on the RF background as seen by the key fob; the car calculates its own RF digest; the key fob transfers its RF digest to the car so that the car can compare the RF digests against one another. If the RF digests differ only slightly, the (vehicle-located) circuit which is processing the comparison may then indicate whether the fob is near enough to the car (as a secure/safe communication), or the fob is not near enough to the car via a larger difference between RF digests. This procedure is thereby used to indicate whether the vehicle access attempt likely is a relay attack. Moreover, characteristics that are unique even from one transmitter to another of the same type (e.g., turn-on transient behavior), may be included in the RF digest for defying such a relay attack. The vehicle-access circuit (e.g., key fob) may monitor the RF spectrum and use observed UWB RF transmissions from the monitored RF spectrum for UWB-based distance bounding, with the metric being at least partly based on the UWB-based distance bounding.

In more detailed/experimental embodiments specific to certain types of RF environments, the system might automatically assess whether a sufficiently good RF background is available for certain steps or methodology to be used. For these embodiments, a sufficiently good RF background refers to the RF background that has strongly varying signals when observed at different positions. This applies for RF signals intended for short-range communications including, as examples, Bluetooth (both "classic" and "Low Energy"), WLAN, GSM, LTI, 5G, and ZigBee; however, this does not apply for broadcast signals such as for radio and television (TV). Also, in a sufficiently good RF background, the RF background strongly varies from one time slot to another, and this holds for above-mentioned short-range communications signals.

Figure 1:
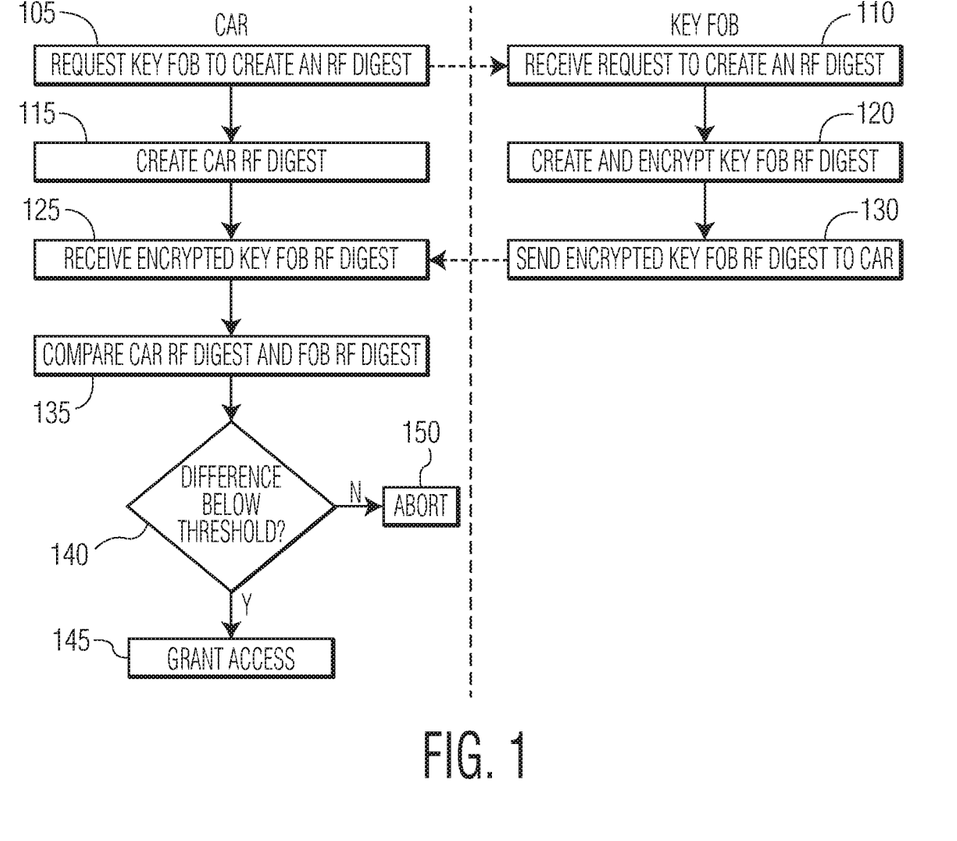
FIG. 1 provides system-level views illustrating example embodiments, in accordance with the present disclosure, involving communications between a vehicle (or car) and a key fob.

Turning now to the illustrations and in accordance with the present disclosure as discussed above, FIG. 1 provides system-level views to show various example embodiments involving communications in such RF background contexts between such a vehicle and a key fob. As a first example embodiment, FIG. 1 is used to show a specific distance bounding protocol which may be used for communications between wireless-based communications circuits respectively in each of a vehicle and a key fob. As shown at 105 and 110 of FIG. 1, the vehicle may detect or sense the presence and/or an access-request from the key fob and send a signal to the key fob in order to request that the key fob create an RF digest based on an RF background observed at the time/location of the request. Next, each of the vehicle and the key fob create an RF digest (or another indication of the observed RF background) as at 115 and 120. In an implementation for which processing of the RF digests is carried out within the vehicle, at 125 and 130 the RF digest created by the key fob is communicated to the vehicle.

As indicated beginning at 125, the RF digest may be optionally encoded or encrypted (the latter via an encryption key) for more secure communications. The vehicle circuitry (e.g., CPU) may be communicatively integrated with the vehicle-located RF receiver and with the vehicle-located wireless transceiver, the latter being used to communicate with the key fob. At 140, vehicle-located circuitry compares the RF digests (or other form of the observed RF background backgrounds) to determine whether to grant access (at 145) or to decline or abort (at 150).

Figure 2:
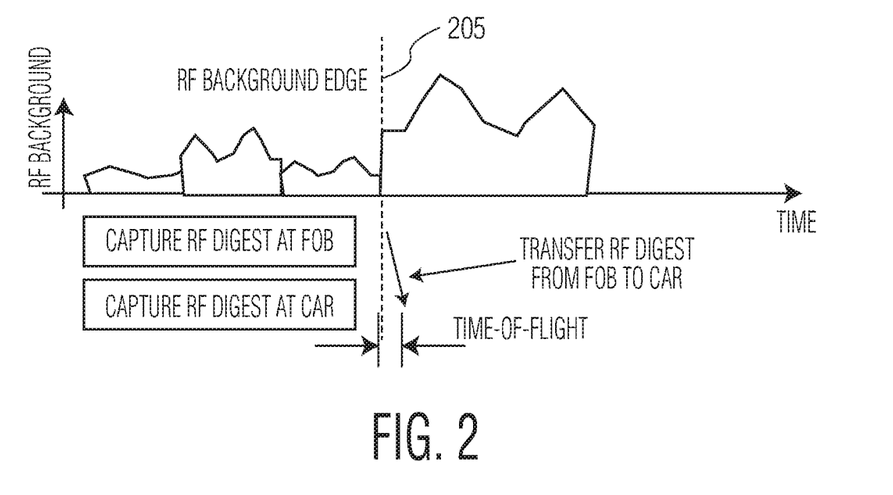
FIG. 2 is graph of an RF background corresponding to a specific example for a system of the type implemented in a manner consistent with FIG. 1 and also in accordance with the present disclosure.

Also in accordance with the present disclosure, FIG. 2 shows another embodiment having features to complement the above-disclosed embodiment types. In FIG. 2, along the vertical line (Y axis) there is shown observed (common) RF background, and along the horizontal line (X axis) time of the observation is shown. With the example embodiment of FIG. 2, the key fob does not send the RF digest as soon as the RF digest is created (or as soon as when the measurement time is over); rather the key fob waits for an edge in the RF background as depicted at the dotted line 205. For example, the edge 205 may be the start of a data packet with high signal strength or another RF signal parameter indicative of timing. As the car receives the same signal edge, the time-of-flight between the fob's RF digest and the signal edge seen by the car, is only small enough if car and fob are close enough to each other as would be indicated by the metric discussed above. This approach provides distance bounding as a feature associated with measuring the time-of-flight in the related communications (e.g., as relating to the observed RF backgrounds and the ability to convey them as part of the above-noted protocol disclosed in connection with FIG. 1).

Figure 3:
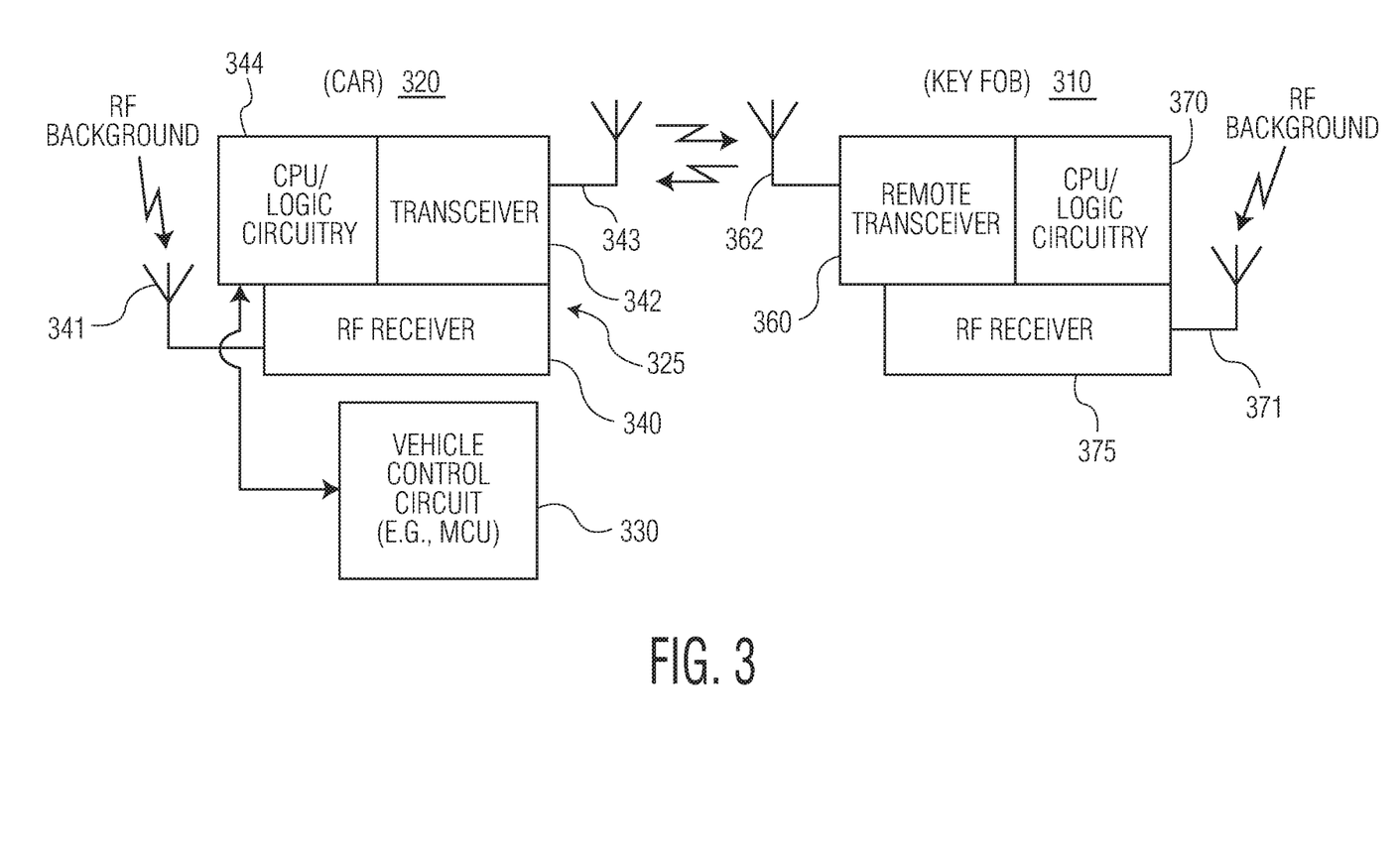
FIG. 3 is a block diagram of circuitries that may be used in connection with use of a key fob to access a vehicle, in accordance with examples provided by the present disclosure.

For illustrative purposes in connection with example types of circuits that may be used in connection with the various example embodiments of the present disclosure, FIG. 3 provides a circuit-based block diagram that may be used in connection with a key fob device 310 to request access to a vehicle at 320 via vehicle-located circuitry including both vehicle-located access-grant circuitry 325 and vehicle control circuitry 330 as may be part of the vehicle master control unit (MCU). The vehicle-located access-grant circuitry 325 includes an RF receiver 340 (having an antenna 341) to observe RF background at the location of the vehicle, a transceiver 342 (having an antenna 343), and a data-processing circuit depicted as a computer processor (CPU) and/or logic circuitry 344, which includes or implements the above-discussed comparison circuit for comparing the RF digests.

The key fob device 310 includes circuits to complement the operations of the circuits in the vehicle-located circuitry, also consistent with the above discussion of example embodiments. These circuits include a (remote) transceiver 360 (having an antenna 362), and a data-processing circuit depicted as another computer processor (CPU) and/or logic circuitry 370, and an RF receiver 375 (having an antenna 371) to observe RF background at the location of the key fob device. The transceiver 342 and the (remote) transceiver 360 may communicate with one another as described in connection with the example protocols associated with FIG. 1, and to effect transfer of the RF digest generated at the key fob device for the above-discussed comparison of the respective RF digests.

In connection with embodiments of the types disclosed above, the wireless data communications (between the vehicle circuitry and the circuitry of the key fob) may include a transmission from the key fob to the vehicle-located circuit with the transmission referenced in real time, or near real time, to an edge corresponding to an abrupt change of a property of the RF signal as observed in at least one of the first and second RF backgrounds by an associated one of the RF receivers. The threshold in this example may correspond at least in part to a measurement of the time-of-flight associated with the transmission. In these regards, the property of the RF signal may refer to or include an amplitude of a given spectral line and/or power within a certain frequency band.

More specifically and as an example way of carrying out this time-of-flight feature in connection with the embodiments shown in connection with the flow depicted in FIG. 1, certain additional steps or activities are performed in each of the vehicle-located circuitry and the circuitry associated with the key fob. With reference to FIG. 1 and in the context of supplementing such flow, these steps or activities may include each such circuitry waiting for the RF background signal edge (e.g., 205 of FIG. 2) before sending the communication(s) from the key fob to the vehicle (i.e., before 125 and 130 of FIG. 2), and also may adding a time-indicative comparison (before the comparison 135 of FIG. 1) such that for an implementation using this time-of-flight feature, before the comparison at 135, a time-indicative comparison is performed so as to compare the time difference of signals edges as depicted in each such RF digest. In connection with this time-indicative comparison, the vehicle-located circuitry determines whether to proceed towards another check before granting access, or to decline the request for vehicle access. If the vehicle-located circuitry determines to proceed towards another check, the same type of comparison as at 135 of FIG. 1 is performed for assessing whether to grant access and if assessing that access should not be granted, the request for vehicle access is declined as at 150 of FIG. 1. In connection with the time-indicative comparison and the other initial comparison as discussed in FIG. 1 and with this example embodiment, it is appreciated that different respective thresholds and associated metrics may be used.

With this approach also involving such a time-indicative comparison, if there were a relay attack scenario, the attacker would likely use a pair of relay stations. In such a scenario, data indicative of the RF background edge would travel from the attacker's relay station (near the vehicle) to the other relay station (near the key fob), and would then be processed by the circuitry of the key fob. The RF digest then needs additional travel time from the key fob to the vehicle. This additional time-of-flight, via the above-described time-indicative comparison, would reveal the relay attack.

In related embodiments which may be used as further alternatives to the embodiments disclosed above, the instant disclosure addresses and inhibits an attacker from performing a relay attack by creating deterministic high-amplitude fake RF background signals, and to create identical signals both at the location of the car and the remote (far distant) location of the key fob. This may be counteracted by: observing the signal amplitude over a longer time before creating the respective RF digests (e.g., before 105 and 110 of FIG. 1, and if there is increased average power right before an attack) both at the car and the key fob site, the RF background is deemed as being highly suspicious and another comparison (which could be included in the flows/protocols depicted in connection with FIG. 1) would reveal an attack such that the access request should be denied. Also, yet another comparison may be performed (also as depicted in connection with FIG. 1 flows/protocols), to check the direction of the RF background signals; if the RF background signals come out of the same direction, this is also highly suspicious since the attacker would likely have the attacking relays (each including transceivers) at the same location. Checking the direction of the RF background signals may be accommodated by including directional RF antennas in each of the circuitries used by the vehicle and the key fob. In the example flow of FIG. 1 or FIG. 2, the additional comparison to check for changes of RF background power may be performed after the RF digests are created and received by the vehicle-located circuitry (e.g., after 125 of FIG. 1) and before the comparison of the RF digests (e.g., before 140 of FIG. 1).

In this way, the respective RF receivers may be used to mitigate possible interference ensuing from undesired or malicious RF signals which are not specific to an RF signal identification for a location common to the first and second RF backgrounds by adjusting at least one RF signal parameter used by the RF receivers to observe the first and second RF backgrounds. The RF signal parameter or RF signal parameters may include one or more of the following: timings or time duration used for the RF receivers observing the first and second RF backgrounds; and assessing if the transmission directions of certain RF signals in the first and second RF backgrounds appear to be co-located.

Accordingly, by observing the signal amplitude over a longer time and/or by checking the direction of the RF background signals, an attacker would not readily spoof such a system by using fake RF background signals. Also in this case, a relay attacker would need to use two different transmitters to create the two (fake) RF background signals. These would then have different location-specific RF backgrounds and/or digests and with the RF digests differing, and the relay attack would be detected and the request denied. In such embodiments, the wireless-communications reflect the actual RF spectrum and at least one type of RF signal types (or signal parameter type) is used as a reference for timing-based distance bounding. Also, the metric may be at least partly based on the reference.

In other related examples, by observing the RF background and taking into account content of one or more specific broadcast signals (e.g., at least one TV (television) broadcast signal and/or at least one radio broadcast signal), an attacker may also be prevented from readily spoofing such a system. In connection with the previously-discussed embodiments, specific implementations may be designed so that they do not use radio/TV broadcast signals (or they are deemphasized relative to the other mentioned signal types) as part of the RF background and/or for creating the RF digest. This follows since they do not change much in space, as they are intended to cover a large region. In accordance with yet another aspect of the instant disclosure, implementations may choose to use a specific channel of radio/TV broadcast signals in the RF background and/or for creating the RF digest for their signal-content properties which can be used to reveal whether the RF background (including such content of a broadcast station) may be closer to the vehicle than to the RF receiver circuitry of the key fob. In case of a relay attack, a key fob receiving such a broadcast station's signal and sending an RF digest that is related to the signal's content to the vehicle, will suffer a long/distinguishable time delay. Again, the different location-specific RF digest of the two transmitters in case of a relay attack would reveal the relay attack.

As further alternatives to the embodiments disclosed above and in connection with the above discussion of examples, another example of embodiment types according to the instant disclosure also refers to the use of radio/TV broadcast signals and addresses the possibility that an attacker would use his/her own fake radio/TV signal. This scenario may be addressed by using an encrypted broadcast signal. The signal is encrypted using a private key, and each receiver has a public key. This holds both for the vehicle receiver and the fob receiver. Such public key encryption is used to prevent attacks on the signal, for example, to prevent use of malicious transmissions of traffic information or emergency warnings. In this case, the car and the fob would not react on the attacker's fake signal, only on the legitimate broadcast signal. With this type of example embodiment, the remaining aspects of operation by the respective circuitries of the vehicle and key fob may follow as described above with the previously-disclosed embodiments, and where the time-of-flight for transmitters that are closer to the car than to the key fob, this approach rules out any relay attack.

Also, in this context and scenario, the RF receivers may be configured to monitor an encrypted signal transmission from a certain TV/radio broadcast station and, in response, provide the metric based at least in part on decryption of the signal transmission and then assess whether the certain television/radio broadcast station is closer to the vehicle-located circuit as secured to the vehicle than to the wireless-communications vehicle-access circuit that includes the other RF receiver.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, controller, and/or other circuit-type depictions (e.g., reference numerals of FIGS. 1 and 2 depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches disclosed herein. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described in connection with the respective steps disclosed herein (e.g., for the circuitry located for the vehicle and/or for the circuitry located for the key fob (or other user-operated access device)). Such an algorithm or process may be used by the programmable circuitry to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, communicating such data between the vehicle-located circuit and the wireless-communications vehicle-access circuit (e.g., as in FIGS. 1 and 2) may include communicating multiple handshake-response communications.

Such modifications do not depart from the true spirit and scope of various aspects of the disclosure, including aspects set forth in the claims

What is claimed is:

1. A method comprising:
comparing a first radio frequency (RF) background observed at a vehicle-located RF receiver that is part of a vehicle-located circuit secured to a vehicle, with a second RF background observed for a wireless-communications vehicle-access circuit that includes another RF receiver, wherein the first RF background and second RF background indicate characteristics associated with variability of spectral power of a number of frequency bands observed at the vehicle-located RF receiver and the wireless-communications vehicle-access circuit respectively, and in response, producing a distance metric indicative of a degree of similarity between the first RF background and the second RF background; and
communicating data between the vehicle-located circuit and the wireless-communications vehicle-access circuit and granting access to the vehicle, via the wireless-communications vehicle-access circuit, in response to the metric satisfying a threshold.

2. The method of claim 1, wherein the vehicle is an automobile and the wireless-communications vehicle-access circuit is a key fob associated with a wireless-communications key-entry circuit in the automobile, and wherein each of the RF receivers is configured to monitor a common range of an RF frequency spectrum spanning frequencies used by disparate RF communications systems to communicate disparate sets of information respective to and on behalf of the disparate RF communications systems.

3. The method of claim 1, further including monitoring the first RF background and the second RF background in response to vehicle-access requests via the wireless-communications vehicle-access circuit, and wherein the metric provides a distance measurement estimating a proximity relationship between the vehicle-located circuit and the wireless-communications vehicle-access circuit.

4. The method of claim 1, wherein the metric provides a distance measurement estimating a proximity relationship between the vehicle and the wireless-communications vehicle-access circuit, the proximity relationship corresponding to a maximum distance for a user to visualize the vehicle while securing the wireless-communications vehicle-access circuit.

5. The method of claim 1, wherein the wireless-communications vehicle-access circuit observes the second RF background to provide an RF digest corresponding to a set of characteristics including the characteristics associated with variability of spectral power of Hall the number of frequency bands wherein communicating data between the vehicle-located circuit and the wireless-communications vehicle-access circuit includes conveying a representation of the RF digest, and further including processing circuitry in the vehicle-located circuit using the representation of the RF digest to generate the metric and assess whether the metric satisfies the threshold for granting access to the vehicle.

6. The method of claim 1, wherein the wireless-communications vehicle-access circuit provides an RF digest in encrypted form to the vehicle-located circuit, and further including processing circuitry in the vehicle-located RF receiver decrypting the RF digest to generate the metric and to assess whether the metric satisfies the threshold for granting access to the vehicle, wherein the RF digest provides RF spectrum data which is specific to a location common to both the RF receivers at least while the first and second RF backgrounds are observed.

7. The method of claim 1, wherein the wireless-communications vehicle-access circuit provides an RF digest in encrypted form to the vehicle-located RF receiver, and further including processing circuitry of the vehicle-located RF receiver decrypting the RF digest to generate the metric and assess whether the metric satisfies the threshold for granting access to the vehicle, wherein the RF digest provides radio-frequency-spectrum data which is specific to transmissions sent from one of the RF receivers to the other of the RF receivers, directly and without an intervening transmission system including RF transceivers to provide a malicious relay or an RF relay communication.

8. The method of claim 1, further including the wireless-communications vehicle-access circuit monitoring RF spectrum and using from the monitored RF spectrum at least one type of RF signals as a reference for timing-based distance bounding, and wherein the metric is at least partly based on the reference; said at least one type of RF signals including one or more of the following: at least one television broadcast signal; and/or at least one radio broadcast signal.

9. The method of claim 1, further including the wireless-communications vehicle-access circuit monitoring RF spectrum and using ultra-wideband (UWB) RF transmissions from the monitored RF spectrum for UWB-based distance bounding, and wherein the metric is at least partly based on the UWB-based distance bounding.

10. The method of claim 1, wherein communicating data between the vehicle-located circuit and the wireless-communications vehicle-access circuit includes communicating multiple handshake-response communications.

11. The method of claim 1, wherein communicating data includes a transmission from the wireless-communications vehicle-access circuit to the vehicle-located circuit referenced in real time, or near real time, to an edge corresponding to an abrupt change of a certain property of the RF signal observed in at least one of the first and second RF backgrounds by an associated one of the RF receivers, and wherein the threshold corresponds at least in part to a measurement of the time-of-flight associated with the transmission, and wherein the certain property of the RF signal refers to or includes an amplitude of a given spectral line and/or power within a certain frequency band.

12. The method of claim 1, further including using the RF receivers to mitigate a possible interference ensuing from undesired or malicious RF signals whish are not specific to an RF signal identification for a location common to the first and second RF backgrounds by adjusting at least one RF signal parameter used by the RF receivers to observe the first and second RF backgrounds; said at least one RF signal parameter including one or more of the following: timings or time duration used for the RF receivers observing the first and second RF backgrounds; and assessing if the transmission directions of certain RF signals in the first and second RF backgrounds appear to be co-located.

13. The method of claim 1, further including the RF receivers monitoring a signal transmission from a certain television/radio broadcast station and, in response, providing the metric based at least in part on assessing whether the certain television/radio broadcast station is closer to the vehicle-located circuit as secured to the vehicle than to the wireless-communications vehicle-access circuit that includes the other RF receiver.

14. The method of claim 1, further including the RF receivers monitoring an encrypted signal transmission from a certain television/radio broadcast station and, in response, providing the metric based at least in part on decryption of the signal transmission and assessing whether the certain television/radio broadcast station is closer to the vehicle-located circuit as secured to the vehicle than to the wireless-communications vehicle-access circuit that includes the other RF receiver.

15. An apparatus comprising:
a data-processing circuit to compare a first radio frequency (RF) background observed for a vehicle-located RF receiver which is part of a vehicle-located circuit secured to a vehicle, with a second RF background observed for a wireless-communications vehicle-access circuit that includes another RF receiver wherein the first RF background and second RF background indicate characteristics associated with variability of spectral power of a number of frequency bands observed at the vehicle-located RF receiver and the wireless-communications vehicle-access circuit respectively, and in response, to produce a distance metric indicative of a degree of similarity between the first RF background and the second RF background; and
wireless communications circuitry to communicate data between the vehicle-located circuit and the wireless-communications vehicle-access circuit and granting access to the vehicle, via the wireless-communications vehicle-access circuit, in response to the metric satisfying a threshold.

16. The apparatus of claim 15, wherein the data-processing circuit is communicatively integrated with the vehicle-located circuit, and the wireless-communications vehicle-access circuit is part of a key fob.

17. The apparatus of claim 15, wherein the wireless-communications vehicle-access circuit is to use ultra-wideband (UWB) RF transmissions from the monitored RF spectrum for UWB-based distance bounding, and wherein the metric is at least partly based on the UWB-based distance bounding.

18. The apparatus of claim 15, wherein the data communicated between the vehicle-located circuit and the wireless-communications vehicle-access circuit includes data for providing multiple handshake-response communications.

19. The apparatus of claim 15, wherein the data communicated between the vehicle-located circuit and the wireless-communications vehicle-access circuit includes a transmission from the wireless-communications vehicle-access circuit to the vehicle-located circuit referenced in real time, or near real time, to an edge corresponding to an RF signal parameter observed in at least one of the first and second RF backgrounds by an associated one of the RF receivers, and wherein the threshold corresponds at least in part to a measurement of the time-of-flight associated with the transmission.

20. A communications system including the apparatus of claim 15, and further including a key fob having the wireless-communications vehicle-access circuit, wherein the wireless-communications vehicle-access circuit is to use ultra-wideband (UWB) RF transmissions from the monitored RF spectrum for UWB-based distance bounding and the metric is at least partly based on the UWB-based distance bounding, and wherein the data communicated between the vehicle-located circuit and the wireless-communications vehicle-access circuit is associated with multiple handshake-response communications between the vehicle-located circuit and the wireless-communications vehicle-access circuit for providing a secure communications channel.

* * * * *